Oct. 5, 1965  R. J. SEVIN ETAL  3,210,016
APPARATUS FOR MILLING AND DISPERSING SUBSTANCES
Filed Nov. 20, 1962  2 Sheets-Sheet 1

INVENTORS
ROGER JOSEPH SEVIN &
GEORGE WILFRID EDWARDS

BY Stevens, Davis, Miller & Mosher
ATTORNEYS

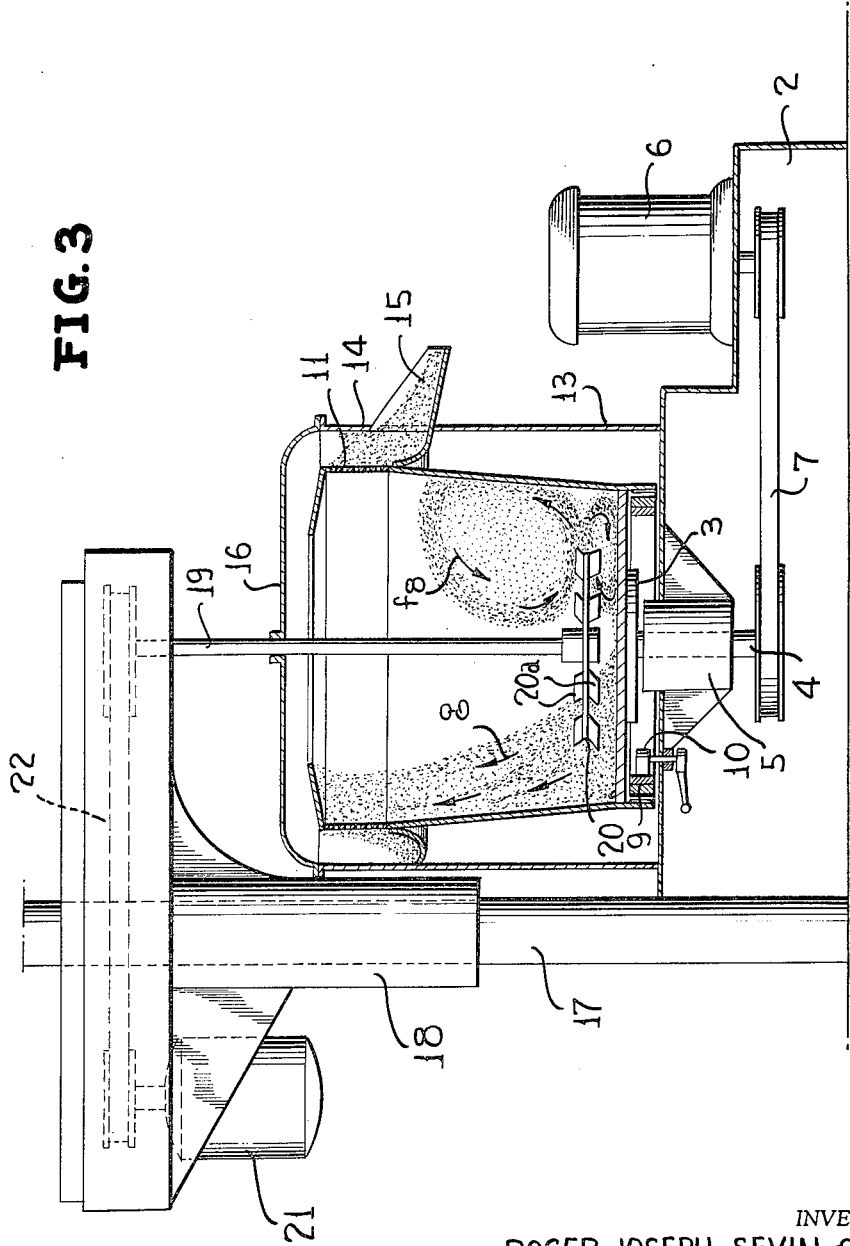

United States Patent Office 3,210,016
Patented Oct. 5, 1965

3,210,016
APPARATUS FOR MILLING AND DISPERSING SUBSTANCES
Roger Joseph Sevin and George Wilfrid Edwards, both of 63 Rue d'Avron, Paris, France
Filed Nov. 20, 1962, Ser. No. 238,916
Claims priority, application France, Nov. 22, 1961, 879,753
6 Claims. (Cl. 241—74)

This invention relates to methods and apparatus for milling and dispersing substances into more finely divided form.

To improve or stimulate milling, inter alia of substances which it is required to disperse finely in a liquid or gas phase, it is conventional for such substances to be agitated with foreign bodies of a generally rounded shape, such as steel balls or cylinders, beach pebbles and even sand. Apparatus working on this principle are often known as ball mills. In this kind of apparatus, the substance to be reduced experiences rubbing, percussion and shearing actions from the milling agents as they roll on one another, the sizes of the particles of substance gradually being reduced. As a rule, very dense and hard elements are used in this apparatus.

It has now been discovered that surprisingly rapid and efficient milling can be effected if the milling agents, instead of being rounded elements which roll on one another with point or linear contact, are elements having plane surfaces by which they slide on one another. With milling agents of this kind, the particles to be milled experience between the surfaces of the milling agents, an intense tearing and shearing action which makes milling and dispersion very effective.

According, therefore, to a first feature of the present invention there is provided a process for milling and dispersing substances to a smaller particle size which comprises vigorously agitating such substances with solid, milling agents having plane surfaces by which they are able to slide on one another.

It is preferred according to the invention to use milling agents of flattened shape—i.e., agents whose thickness is reduced as compared with their other dimensions, such as low thickness parallelepipedic rectangles. The agents used for any particular milling operation are, with advantage, of the same thickness as one another so that they can form in the milling apparatus elementary layers which slide on one another.

Tha dimensions of the milling agents may be varied in accordance with the apparatus used and with the intrinsic nature of the said agents. The substance used for the milling agents need not necessarily be dense and very hard. For instance, satisfactory results are obtained with milling agents made of porcelain, ceramic, metal, steatite, agglomerated carborundum and in particular by milling agents made of plastics such as polystyrene, polyamides, polyvinyl chloride, polyesters, polyolefines, e.g., polyethylene, nylon and the substances sold under the trademarks Teflon, Rilsan, Galalithe, Lucolene and Delrin.

These plastics have the advantage of not being brittle and so have a reduced tendency to the formation of fine particles contaminating the milled and dispersed materials. Further, they are light in weight so that less mechanical power is required to drive the apparatus. Their low density is also frequently an advantage in the separation of the dispersed product and the milling agents. Another advantage of these plastics is their smooth and noiseless operation. Milling and dispersion can be performed in any appropriate continuous or discontinuous milling apparatus of the "ball" type known per se. Preferably, an apparatus comprising a rotating vessel whose top part has a screen fine enough to retain the milling agents is employed. Milling is performed in two phases. In the first phase, the vessel remains stationary, and the mixture of products to be milled and of milling agents is agitated by means of a rotor; in the second phase the vessel is rotated to remove the milled products, the milling agents being retained by the screen.

According, therefore, to a further feature of the present invention there is provided apparatus for use in milling substances to smaller particle size which comprises a vessel charged with milling agents having plane surfaces by which they are able to slide on one another, a closure consisting of a screen fine enough to retain said agents, means for rotating the vessel on its axis and a rotor for mixing the contents of the vessel.

Specific embodiments of the present invention are illustrated in the accompanying drawings, in which:

FIG. 3 is a view in partial section of an apparatus according to the invention.

Figure 1:
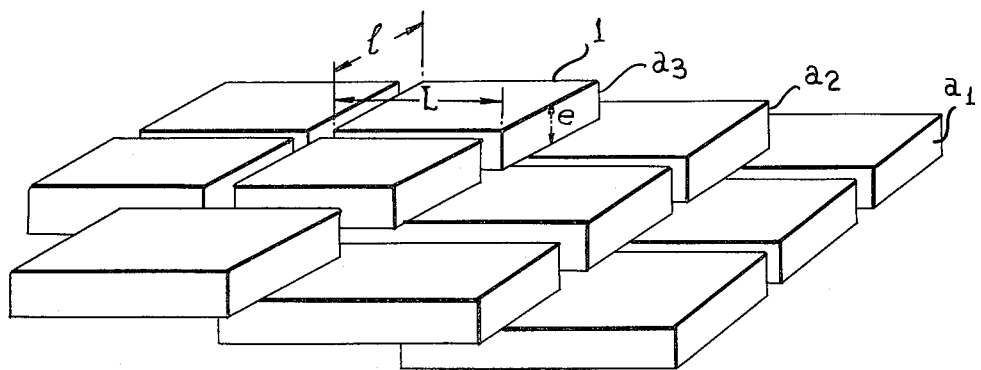
FIG. 1 is a diagrammatic perspective view showing milling agents according to the invention.

Referring to FIG. 1, milling agents 1 are in the form of flattened parallelepipedic rectangles whose thickness $e$ is preferably the same for all the agents used in a single operation and is small relatively to the other two dimensions 1 and L, these latter preferably being substantially equal to one another and the same in every agent. These dimensions may vary within wide limits, inter alia in accordance with the substances to be milled and the apparatus used.

Figure 2:
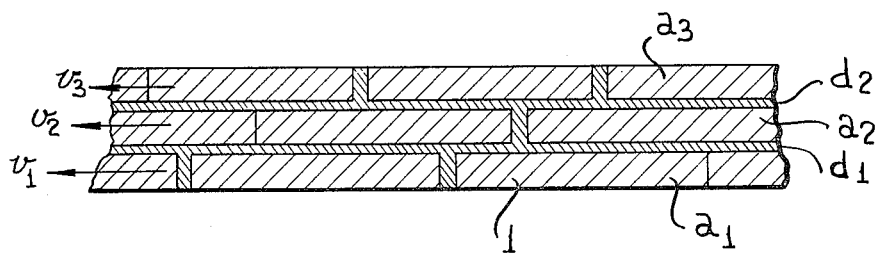
FIG. 2 is a diagrammatic sectional view showing the action of the milling agents.

In operation, the agents 1 when dispersed in a continuous moving phase, such as a mixture of liquids and of particles to be milled and dispersed, tend to become aligned in a direction of least resistance and to be disposed in consecutive layers $a_1$, $a_2$, $a_3$, separated by films or thicknesses $d_1$, $d_2$ and so on of substance, as can be seen in FIG. 2. If the speeds of displacement $V_1$, $V_2$, $V_3$ and so on of the various layers are unequal, as is usually the case, the films $d_1$, $d_2$ and so on between the layers $a_1$, $a_2$, $a_3$ experience shearing effects which mill the particles or agglomerates which they contain. The shearing effect is directly proportional to the speed differences ($V_1$, $V_2$; $V_2$, $V_3$) and inversely proportional to the distance between consecutive layers ($a_1$, $a_2$, $a_3$—i.e., to the thickness of the films ($d_1$, $d_2$)). This thickness can be varied by modifying the concentration of milling agents or of particles to be milled in the dispersing liquid by enforced heaping of the milling agents, for instance by means of pressure or by centrifuging, or by choosing the sizes and density of the milling agents appropriately. The sliding of the consecutive layers of milling agents can be produced in various ways, for instance, by direct drive by means of agitators or blade or disc mixers or by vibration.

The apparatus of FIGURE 3 comprises a base 2 on which is mounted a plate 3 with its axis vertical and having a shaft 4 which rotates in bearings 5 and which can be driven by a motor 6 through a transmission 7. A vessel 8 is placed on the plate and may be, for instance, slightly frustum-shaped; the base of the vessel 8 has a braking ring 9 co-operating with shoes 10 disposed in the base 2. The top part of the vessel 8 includes a lateral screen 11 of fine enough mesh to pass the milled product while retaining the milling agents. A relatively flat frustum-shaped edge or lid 12 surrounds the top part of the screeen. The vessel 8 is contained in a casing 13 having at its top an annular collector 14 opening into a spout 15. The vessel is closed at the top by a cover 16.

Combined with the apparatus just described is a mixer comprising a bracket 17 on which is slidable a head 18 bearing a rotating shaft 19; rigidly secured thereto is a perforated mixing rotor 20 having inclined fins 20a on its two surfaces in the vicinity of the perforations. A motor 21 drives the shaft 19 through a variable-speed transmission 22.

Operation of the apparatus comprises two stages: in the first stage, the solid particles or agglomerates to be milled are placed in the vessel 8, which does not rotate, a support liquid also being provided if necessary or desirable. The rotor 20 is rotated to agitate—and therefore to disperse and mill—the particles. This stage is diagrammatically illustrated in the right-hand part of the vessel in FIG. 3. The milling agents travel in layers one above another along the side wall of the vessel to drop into the central part thereof, travelling along a continuous circuit as indicated by arrows $f$.

Upon the completion of milling the rotor is stopped and, if need be, withdrawn from the vessel, whereafter the same is rotated at high speed; the composition contained in the vessel is centrifuged, the milled and dispersed product rising along the walls and passing through the screen 11 into the collector 14 to spill over into the spout 15. The milling agents are retained by the screen. The operation can be restarted when the milling agents have been tipped back into the vessel.

The following example will serve to illustrate the invention:

*Example*

In an apparatus of the kind just described whose vessel has a mean diameter of 320 mm. and a height of 350 mm., the rotor being 250 mm. in diameter and rotating at 300 r.p.m., the following ingredients for manufacturing a paint are introduced:

Lithopone _____kg__ 14
Isophthalic resin _____kg__ 2.7
White spirit _____kg__ 3.5

After the rotor has rotated for 15 minutes, milling and dispersion seem to have reached their maximum, corresponding to points 2 or 3 of the north gauge ($40\mu$ particle size). At this stage of mixing, 4.5 kg. of milling agents formed by small squares of Lucolene (pasticised polyvinyl chloride) measuring about 1.5 mm. x 2.5 mm. x 3 mm. are introduced into the vessel. After rotation of the rotor for 3 minutes the fineness of the product reaches point 10 (maximum fineness) of the gauge (particle size less than $10\mu$).

The method and apparatus of this invention have many uses, e.g., wet milling and dispersion of paper pulp fillers, the dispersion of pigments and fillers in viscose or plastic pastes for spinning or coating, the milling and dispersion of dyes during manufacture or in textile dyeing, the milling and dispersion of fillers and colouring agents in the manufacture of lacquers, paints, inks and the like, milling and homogeneisation of colouring mixtures, of dry powders, and the reduction of foodstuffs such as mustard.

We claim as our invention:

1. An apparatus for milling and dispersing substances by agitating the substances in admixture with solid milling agents, comprising in combination: a frame; a vessel mounted on said frame for rotation about a vertical axis; said vessel having a solid bottom and side walls; a first driving means for rotating said vessel about said axis; a lateral screen located at the upper part of said vessel, for permitting the escape of the milled substance from said vessel, said screen being of a sufficient fineness to retain said milling agents; rotatable means mounted on said frame for rotation within the bottom part of said vessel about said vertical axis, whereby to agitate said substances in said vessel; and second driving means for rotating said rotatable means, said first and said second driving means being independently operable.

2. The combination of claim 1 further comprising an annular collector mounted on said frame around said vessel close to and below said upper part, whereby the substances passing through said screen may be collected.

3. An apparatus for milling and dispersing substances by agitating the said substances in admixture with solid milling agents, comprising in combination: a base; a vertical vessel, having solid bottom and side walls and a circular cross-section, mounted on said base for rotation about its axis; a lateral screen located at the upper part of said vessel, for permitting the escape of the milled substance from said vessel; said screen being of a sufficient fineness to retain said milling agents; a lid extending inwardly from the upper edge of said vessel and located above said screen, said lid leaving a part of the top of said vessel open; first driving means for rotating said vessel; a vertical support located beside said frame; a first frame slidably mounted on said support; a vertical shaft mounted on said first frame for rotation about an axis adapted to be brought into coincidence with the axis of said vessel; rotatable means mounted on said shaft for agitating the contents of said vessel; and second driving means supported by said first frame for rotating said shaft, said first and said second driving means being independently operable.

4. The combination of claim 3 wherein said base carries a housing surrounding said vessel, said housing comprising an annular collector mounted around said vessel close to and below said upper part, whereby the substances passing through said screen may be collected.

5. The combination of claim 4 wherein said shaft passes through a cover for closing said housing.

6. The combination of claim 3 wherein braking means are provided between said base and said vessel.

References Cited by the Examiner

UNITED STATES PATENTS

| | | | |
|---|---|---|---|
| 329,708 | 11/85 | Boyd | 241—85 |
| 801,854 | 10/05 | Dorey. | |
| 1,431,475 | 10/22 | MacDonald | 241—184 |
| 1,720,024 | 7/29 | Young | 241—184 |
| 2,562,560 | 7/51 | McCartney | 241—79 X |
| 2,586,338 | 2/52 | Hushley et al. | 241—184 X |
| 2,590,237 | 3/52 | Doering | 241—79 X |
| 2,978,850 | 4/61 | Gleszer | 51—164.5 X |

FOREIGN PATENTS 261,664   10/26   Great Britain.

J. SPENCER OVERHOLSER, *Primary Examiner.*